United States Patent
Hsu et al.

(10) Patent No.: US 8,638,238 B2
(45) Date of Patent: Jan. 28, 2014

(54) PARKING SPACE DETECTION DEVICE AND METHOD THEREOF

(75) Inventors: Chan-Wei Hsu, Changhua County (TW); Liang-Yu Ke, Changhua County (TW); Ming-Kuan Ko, Changhua County (TW)

(73) Assignee: Automotive Research & Test Center, Changhua County (TW)

(*) Notice: Subject to any disclaimer, the term of this patent is extended or adjusted under 35 U.S.C. 154(b) by 339 days.

(21) Appl. No.: 13/209,482

(22) Filed: Aug. 15, 2011

(65) Prior Publication Data

US 2013/0021171 A1    Jan. 24, 2013

(30) Foreign Application Priority Data

Jul. 22, 2011    (TW) .............................. 100126041 A

(51) Int. Cl.
G08G 1/00    (2006.01)
G08G 1/01    (2006.01)
G08G 1/04    (2006.01)

(52) U.S. Cl.
USPC ......... 340/932.2; 340/933; 340/935; 340/943

(58) Field of Classification Search
USPC ...................................................... 340/932.2
See application file for complete search history.

(56) References Cited

U.S. PATENT DOCUMENTS

| 7,089,101 | B2* | 8/2006 | Fischer et al. ................... 701/41 |
| 7,409,295 | B2* | 8/2008 | Paradie ......................... 701/301 |
| 7,538,690 | B1* | 5/2009 | Kaplan et al. .............. 340/932.2 |
| 2010/0318290 | A1* | 12/2010 | Kaplan et al. ................. 701/202 |
| 2012/0013485 | A1* | 1/2012 | Pampus et al. ............. 340/932.2 |
| 2012/0062396 | A1* | 3/2012 | Inoue et al. ............... 340/932.2 |

* cited by examiner

*Primary Examiner* — Jennifer Mehmood
*Assistant Examiner* — John Mortell
(74) *Attorney, Agent, or Firm* — Rosenberg, Klein & Lee

(57) ABSTRACT

A parking space detection device and method thereof, wherein, firstly, store a plurality of border data relating to moved distance of a vehicle, and distance between vehicle and an obstacle for reverse transmission of ultrasonic waves; then determine if said border data satisfy evaluation conditions, such that it is in a first detecting parking space then obstacle state, or in a first detecting obstacle then parking space state. Wherein, in case that any of evaluation conditions is satisfied, start to calculate a first difference between each of said border data and their average, to determine if it is grater than a standard deviation; in case that answer is positive, fetch at least two data points, a first data point and a second data point, corresponding to border data, then calculate their difference to adjust weights of first data point and second data point, in obtaining a highly accurate parking space.

8 Claims, 5 Drawing Sheets

PARKING SPACE DETECTION DEVICE AND METHOD THEREOF

BACKGROUND OF THE INVENTION

1. Field of the Invention

The present invention relates to a parking space detection device and method thereof, and in particular to a parking space detection device and method thereof, that is capable of detecting distance of a vehicle to a parking space and at least an actual border position by means of ultrasonic wave, so as to raise the accuracy of detecting a parking space.

2. The Prior Arts

Along with the rapid progress and development of science and technology, vehicle such as automobile has become a basic necessity to improve our living standard and quality of life, so it plays an important and indispensable role in our daily life. Yet due to the very limited space in cities, usually the parking space available is only slightly larger than the size of a vehicle, such that in parking a vehicle, the driver must depend on his own eyes and sense of distance to determine if the parking space is sufficiently large. However, this kind of approach has the following drawbacks and disadvantages: only when in a parking process, does the driver discover that the parking space is not large enough to park his vehicle, so he has to find another parking space. As such, this is not only a waste of time, but it also tends to block the normal traffic around the parking space, in causing great inconvenience to the drivers; or in parking a vehicle, the driver has to move the vehicle forward, backward, left, and right repeatedly due to his inexperienced parking skill, and that may also lead to scratching the adjacently parked vehicle.

The problems and shortcomings mentioned above bring about a parking assistance device to assist the driver in detecting if the parking space is sufficient while conducting parallel parking. In this respect, according to the existing technology, detectors can be installed on the sides of a vehicle to detect the distance between two obstacles, in determining if the parking space is large enough. However, in conducting this kind of detection while the vehicle is moving, and when the vehicle passes through the obstacles, the data thus detected and obtained is somewhat deviated from the real situation, due to the wide reflection angle, unstable direction, and transmission delay of ultrasonic waves, hereby causing errors in the detected distance to the parking space. Therefore, presently, the problem of how to increase the accuracy of detecting distance to a parking space is an urgent task that must be solved in this field.

SUMMARY OF THE INVENTION

A major objective of the present invention is to provide a parking space detection device and method thereof, such that it utilizes ultrasonic wave detection to calculate the positions of obstacles and parking space, in obtaining highly accurate packing space position and its actual border position, hereby solving the problem of the prior art that, significant deviations exist between detected and actual parking space positions.

Another objective of the present invention is to provide a parking space detection device and method thereof, such that upon detecting a highly accurate parking space position, it can activate an automatic parking system to park the vehicle automatically, without the need of tedious operations of manual parking.

In order to achieve the above-mentioned objective, the present invention provides a parking space detection method, including the following steps: place an ultrasonic wave distance detector on sides of a vehicle, and upon activating a parking space detection device, start storing a plurality of border data relating to moved distance of a vehicle, and a plurality of border data relating to distance between a vehicle and an obstacle for reverse transmission of ultrasonic waves, in determining if the border data satisfy a first evaluation condition, such as a first-detecting-parking-space-then-obstacle state, and if the answer if negative, then it is quite possible that the vehicle is in the parking space, so it can determine if the border data satisfy a second evaluation condition, such as a first-detecting-obstacle-then-parking-space state, if the answer is negative, then store the border data again, until it determines that one of the first evaluation condition and second evaluation condition is satisfied. Then, start to calculate a standard deviation of these border data. Subsequently, determine in sequence if a first difference between the each of the border data and their average is greater than the standard deviation, and in case the answer is negative, recalculate the standard deviation of these border data; otherwise, fetch at least two data points from the corresponding border data, to calculate a second difference between the first data point and the second data point, and that is used to compensate lateral error of parking space positions. Finally, execute weight adjustments for the first data point and the second data point based on the second difference and the vehicle driving speed, in obtaining a parking space position and at least an actual border position of high accuracy.

In addition, the present invention provides a parking space detection device, installed on a vehicle, comprising: an ultrasonic wave distance detector, provided on sides of a vehicle to detect a plurality of border data relating to distance between the vehicle and an obstacle for reverse transmission of ultrasonic waves; a move distance detector, to detect a plurality of border data relating to moved distance of a vehicle; and a storage unit, used to store a plurality of border data relating to distance between the vehicle and the obstacle for reverse transmission of ultrasonic waves, and moved distance of the vehicle; and a processing unit, connected to the ultrasonic wave distance detector, the move distance detector, and the storage unit, to calculate a parking space position and at least an actual border position based on the moved distance of the vehicle and the distance for reverse transmission of ultrasonic waves.

Further scope of the applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

BRIEF DESCRIPTION OF THE DRAWINGS

The related drawings in connection with the detailed description of the present invention to be made later are described briefly as follows, in which.

DETAILED DESCRIPTION OF THE PREFERRED EMBODIMENT

The purpose, construction, features, functions and advantages of the present invention can be appreciated and understood more thoroughly through the following detailed description with reference to the attached drawings.

Figure 1:
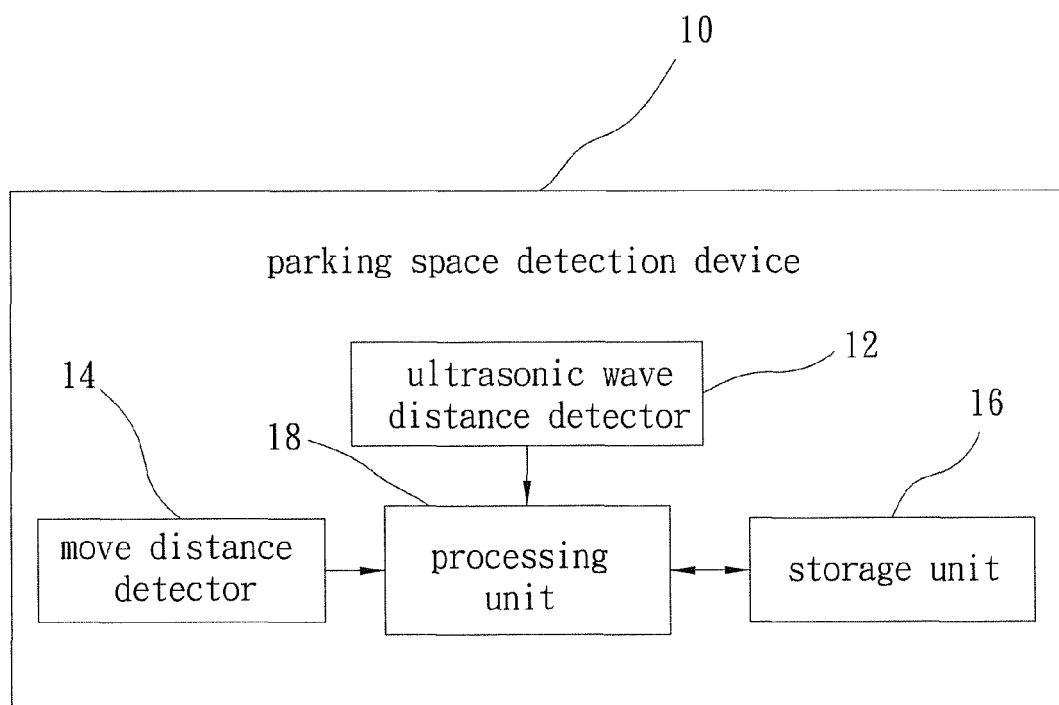
FIG. 1 is a schematic diagram of a parking space detection device according to the present invention.

The present invention provides a mechanism for locating a parking space quickly and accurately. Refer to FIG. 1 for a schematic diagram of a parking space detection device according to the present invention. As shown in FIG. 1, the parking space detection device 10 comprises: an ultrasonic wave distance detector 12, a move distance detector 14, a storage unit 16, and a processing unit 18 connected to the components mentioned above. The parking space detection device 10 is installed on a vehicle, and when the driver intends to find an adequate parking space, he may activate the parking space detection device 10 to perform the functions required.

Figure 2:
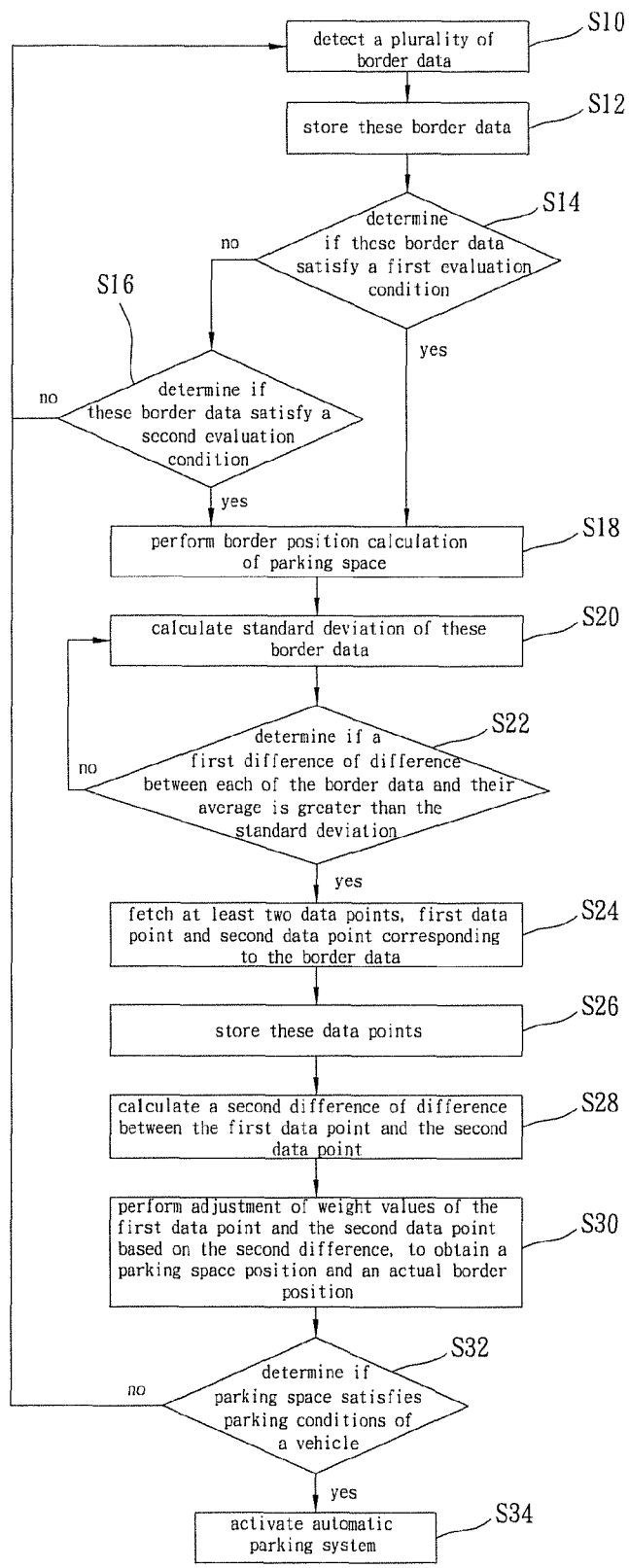
FIG. 2 is a flowchart of the steps of a parking space detection method according to the present invention.

Wherein, the ultrasonic wave distance detector 12 is located on sides of a vehicle, for a more detailed description of the parking space detection method of the present invention, refer to FIGS. 1 and 2 simultaneously. Wherein, FIG. 2 is a flowchart of the steps of a parking space detection method according to the present invention. As shown in FIG. 2, firstly, perform step S10, detect and obtain a plurality of border data, wherein each border data includes: distance between the vehicle and an obstacle for reverse transmission of ultrasonic waves as detected by an ultrasonic wave distance detector 12, and a moved distance of vehicle as detected by the move distance detector 14, so that the X axis and Y axis coordinates of actual vehicle position at present and the evaluated obstacle position can be known from the distance for reverse transmission of ultrasonic waves and the moved distance of the vehicle. Next, as shown in step S12, storage unit 16 stores continuously the plurality of border data. Then, as shown in step S14, the processing unit 18 determines if the border data satisfies the first evaluation condition, that means that the border data detected presently is less than a preset value, and the previous border data is greater than the preset value, so the preset value is preferably set to be 200 cm. If the border data does not satisfy the first evaluation condition, then it is quite possible that the vehicle is presently in the parking space or near obstacles.

Then, perform the next step S16, determine if the border data satisfies a second evaluation condition, that means that the border data detected presently is greater than the preset value, such that the preset value is preferably set to be 200 cm. In case that the border data does not satisfy the second evaluation condition, then the process return to step S10, that indicates that there are no parking spaces satisfy the evaluation, so it needs to store continuously more border data to proceed with subsequent determination steps. In case that the border data can satisfy the second evaluation condition, then set the parking space detection to be in a first-detecting-obstacle-then-parking-space state. In other words, the parking space in located in front of the obstacle, thus the second evaluation condition relates to a border position Edge 0 of the parking space to be evaluated.

Figure 3:
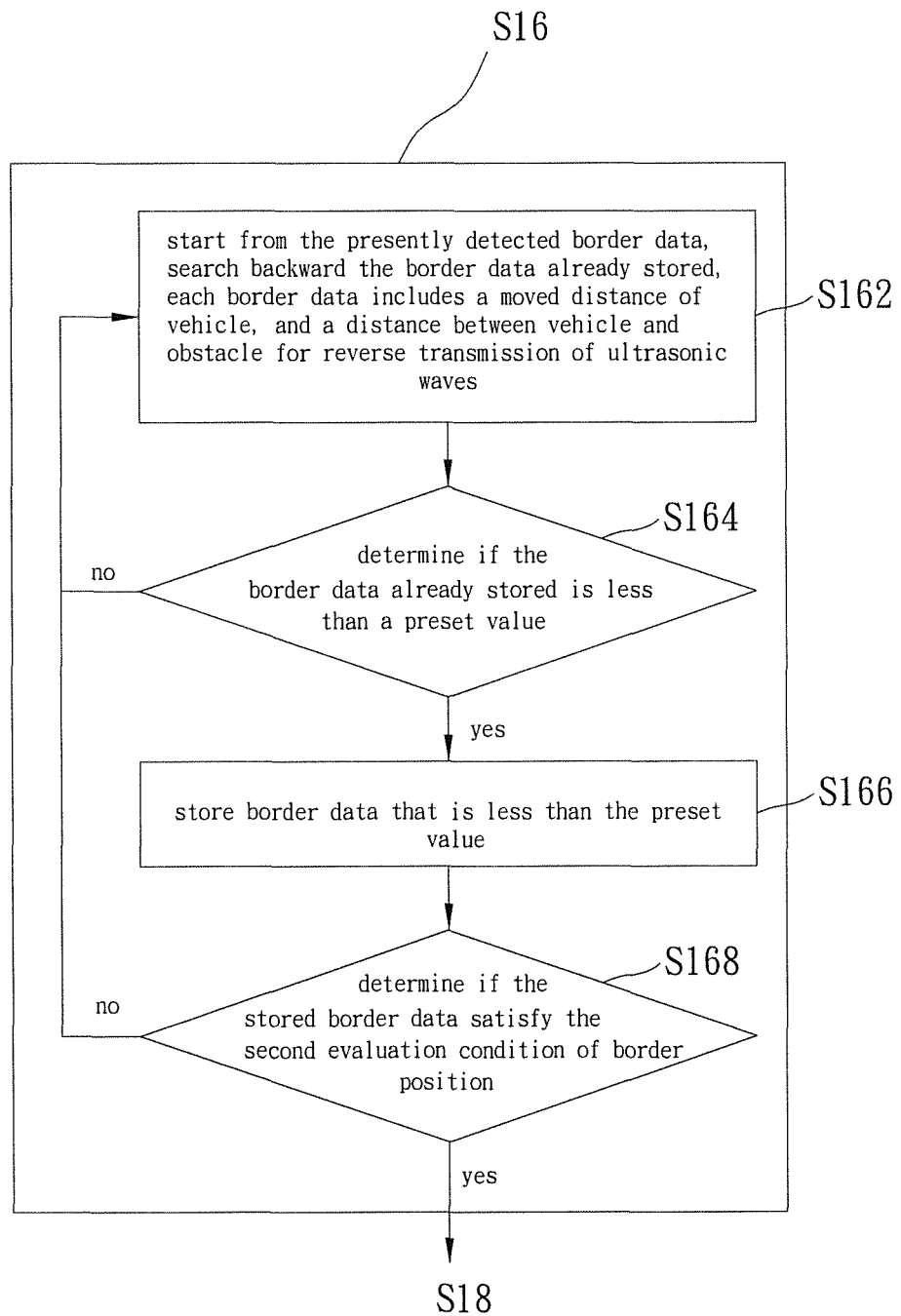
FIG. 3 is a flowchart of the steps of calculating border data from a parking space to an obstacle according to the present invention.

Meanwhile, refer to FIG. 3 for a flowchart of the steps of evaluating border data from a parking space to an obstacle according to the present invention. As shown in FIG. 3, step S16 includes the following steps: firstly, in step S162, from the border data detected and obtained at present, to be more specific, it is determined that the border data satisfying the Edge 0 condition as the presently detected border data, and start to search backward the previously stored border data (such as historical border data), such that each border data contains moved distance of vehicle, and distance between vehicle and obstacle for reverse transmission of ultrasonic waves. Next, as shown in step S164, determine if the stored border data is less than a preset value, that is preferably set to be 200 cm, and if the answer is negative, return to step S162; otherwise, perform step S166, store border data less than the preset value. Finally, perform step S168, determine if the stored border data satisfies a second evaluation condition of border position, that means that the moved distance of vehicle (d) is greater than 250 cm or number of border data is greater than 30. In case the answer is negative, then return to step S162, search backward to the previously stored border data; otherwise, perform the next step S18 to proceed with calculation of the border position of the parking space.

In the previously mentioned step S14, in case that the processing unit 18 determines that the border data satisfies the first evaluation condition, then set the parking space detection to be in a first detecting parking space then obstacle state. In other words, the parking space in located in rear of the obstacle, thus the first evaluation condition relates to a border position Edge 1 of the parking space to be evaluated.

Figure 4:
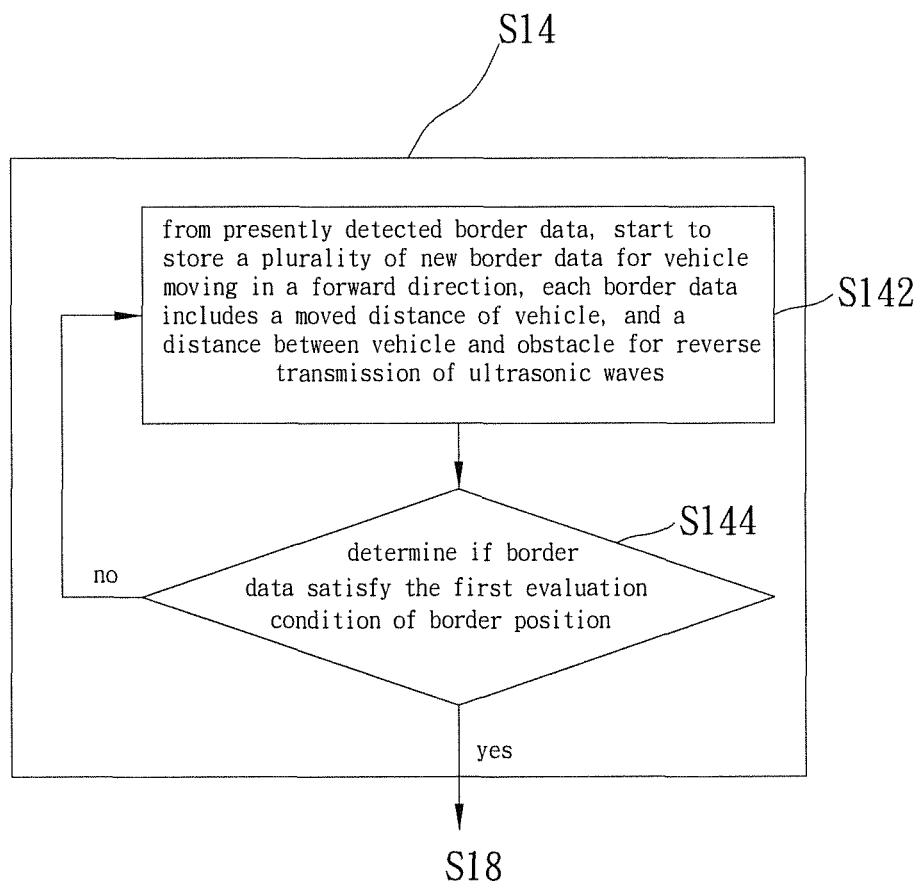
FIG. 4 is a flowchart of the steps of calculating border data from an obstacle to a parking space according to the present invention.

Meanwhile, refer to FIG. 4 for a flowchart of the steps of evaluating border data from an obstacle to a parking space according to the present invention. As shown in FIG. 4, step S14 includes the following steps: firstly, in step S142, from the border data detected and obtained at present, to be more specific, it is determined that the border data satisfying the first evaluation condition of Edge 1 as the presently detected border data, and start to store a plurality of new border data for the vehicle moving in a forward direction (such as the future border data), with each of the new border data includes the moved distance of the vehicle, the distance between the vehicle and the obstacle for reverse transmission of ultrasonic waves. Next, as shown in step S144, determine if the plurality of border data stored satisfy the first evaluation condition of border position, namely, the moved distance of the vehicle (d) greater than 250 cm, the number of border data is greater than 30, or distance for reverse transmission of ultrasonic waves is greater than 200 cm. In case that any of the first evaluation conditions of border position is satisfied, then perform step S18 to calculate border position of parking space; otherwise, return to step S142, the vehicle keeps on moving forward, meanwhile storing much more new border data.

It is worth mentioning that, regardless the processing unit 18 determines that the border data satisfies the first evaluation condition or the second evaluation condition, for both cases the parking space border position calculation method are the same. When starting to perform the steps of calculating border position of the parking space, as shown in step S20, firstly, the average value of border data has to be calculated through the equation (1) as shown as follows:

$$m = \frac{\sum_{i=1}^{N} x_i}{N}. \tag{1}$$

wherein, m is an average value of the border data, N and i are real numbers, x is border data, such the average value of border data is obtained through adding $X_1, X_2, \ldots, X_n$ of N border data divided by total number of border data. Then, calculate the standard deviation of these border data by means of equation (2) as follows:

$$s = \sqrt{\frac{\sum_{i=1}^{N}(x_i - m)^2}{N}} \quad (2)$$

wherein, s is the standard deviation of border data, m is the average value of border data, N and i are real numbers, x is border data. In order to avoid that the border data detected to be overly dispersive, due to the moving speed of the vehicle, thus resulting in error of evaluation; therefore, standard deviation is used to evaluate the dispersion of the border data, then perform the subsequent error compensation step. Next, as shown in step S22, determine sequentially if the first difference between each of the border data and the average of border data is greater than the standard deviation. To be more specific, the first difference is obtained through subtracting the average value of the border data from each of the border data, then determine if the first difference is greater than the standard deviation, and in case the answer is negative, return to step S20.

Figure 5:
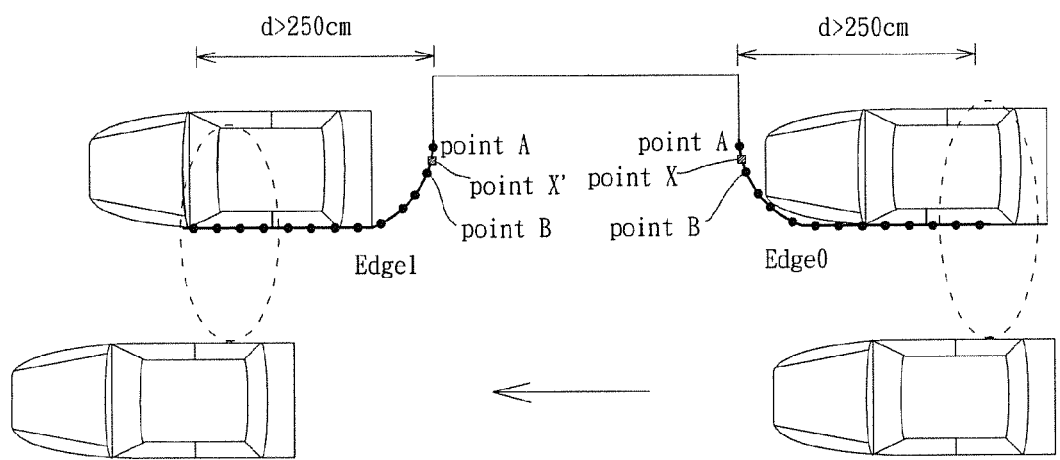
FIG. 5 is a schematic diagram of detecting actual positions of a parking space according to the present invention.

In order to understand further how the present invention actually calculate at least a border position of a parking space, refer to FIG. 5 for a schematic diagram of detecting position of an actual parking space according to the present invention. In case that the first difference thus obtained is greater than the standard deviation, then perform step S24, to fetch at least two data points, namely the first data point and the second data point, from the corresponding border data. In the present embodiment, the first data point is designated as point A, and the second data point is designated as point B. Wherein, the data point is a border position, and that is obtained through first finding out the first border data, such that its difference with the average value of border data, namely, the first difference is greater than the standard deviation; and this border position is still not the actual border position, since lateral error compensation has to be performed. Therefore, the first border data whose first difference is greater than the standard deviation has first to be found to serve as the first data point, and the border data after that to serve as the second data point, such that the second data point is used as an error compensation value. Then, perform step S26, for the storage unit 16 to store the data points. Subsequently, as shown in step S28, calculate a second difference between the first data point and the second data point. Finally, perform step S30, perform weights adjustment for the first data point and the second data point based on the second difference, hereby obtaining a parking space position and at least an actual border position. Wherein, the weight adjustment of actual border position is realized by using the coefficients of cubic equation (3) by means of curve fitting compaction as follows:

$$\text{actual border position} = K_1 \times B + K_2 \times A \quad (3)$$

wherein, $K_1 = \alpha V^3 + \beta V^2 + \gamma V + \delta$, V is vehicle speed; $K_2 = (1-K_1)$, coefficient $\alpha, \beta, \gamma$ and $\delta$ are parameters set according to vehicle speed, as shown in the following table:

| Vehicle speed (kph) | Parameter (<1) |
| --- | --- |
| 10 | 0.8 |
| 15 | 0.55 |
| 20 | 0.45 |
| 25 | 0.3 |
| 30 | 0.15 |

From the description mentioned above it can be known that the border position of initial evaluation is Edge 0 or Edge 1, such that through the same border position calculation, the actual border position can be obtained. By way of example, in a process of detecting a parking space, in case that the processing unit 18 determines that the border data obtained satisfy the second evaluation condition, namely, it is in a first detecting obstacle then parking space state, then firstly perform actual border position calculation of border position Edge 0, and perform step S18 to S30 to obtain the first actual border position, as designated as point X in FIG. 5. Then, when the vehicle continues to move forward, and in case that the processing unit 18 determines that the border data obtained satisfy the first evaluation condition, thus it is in a first detecting parking space then obstacle state, then perform actual border position calculation of border position Edge 1, and perform steps S18 to S30 to obtain the first actual border position, as designated as point X' in FIG. 5. Upon calculating in sequence point X and point X' and obtaining an actual parking space position, then perform step S32 to determine if the actual parking space satisfies the parking conditions of the vehicle, namely, the width and depth of the parking space must fulfill the minimum values required for parking the vehicle; and if the answer is negative, return to step S10, to detect the next parking space as required. Otherwise, perform step S34 to activate the automatic parking system, so that the vehicle can park accurately and quickly on the actual parking space. As such, the parking space detection device 10 of the present invention can be used in cooperation with the existing automatic activation parking system to proceed with the parking without the need of complicated actions of manually selecting parking position, in achieving great parking convenience and efficiency.

In the process of detecting parking space, it is possible that only a point X can be detected, that means obstacle exists only on one side of the parking space, then the actual point X can be first calculated through a plurality of border data in a specific range as stored, and then based on the moved distance of the vehicle and distance for reverse transmission of ultrasonic waves to learn if the width and depth of the parking space are sufficient to park the vehicle. Similarly, it is possible that only a point X' can be detected, that means obstacle exists only on one side of the parking space, then the actual point X' can be calculated through a plurality of border data in a specific range as stored, and then based on the moved distance of the vehicle and distance for reverse transmission of ultrasonic waves to learn if the width and depth of the parking space are sufficient to park the vehicle. As such, in the present invention, ultrasonic wave detection is used to calculate the positions of the obstacle and the parking space, in obtaining a parking space position and at least an actual border position with high accuracy, hereby solving the problem of significant error of the prior art in detecting the actual position of a parking space.

The above detailed description of the preferred embodiment is intended to describe more clearly the characteristics and spirit of the present invention. However, the preferred embodiments disclosed above are not intended to be any

What is claimed is:

1. A parking space detection method, comprising following steps:
   A. store a plurality of border data, each containing a moved distance of a vehicle and a distance between said vehicle and an obstacle for reverse transmission of ultrasonic waves;
   B. determine if said border data satisfy a first evaluation condition, if answer is negative, perform next step C, otherwise, perform following step D;
   C. determine if said border data satisfy a second evaluation condition, if answer is negative, return to step A, otherwise perform next step D;
   D. calculate a standard deviation of said border data;
   E. determine if a first difference of difference between each of said border data and their average is greater than said standard deviation, if answer is positive, then fetch at least two data points, a first data point and a second data point from corresponding border data, and perform next step F, otherwise return to said step D;
   F. calculate a second difference between said first data point and said second data point; and
   G. perform weight adjustment for said first data point and said second data point based on said second difference, to obtain a parking space position and an actual border position.

2. The parking space detection method as claimed in claim 1, further comprising:
   a step H, determine if said parking space satisfies parking conditions of said vehicle, if answer is positive, activate an automatic parking system, otherwise, return to said step A.

3. The parking space detection method as claimed in claim 2, wherein said parking condition is that if width and depth of said parking space satisfy minimum values required for parking said vehicle.

4. The parking space detection method as claimed in claim 1, wherein in a step B, satisfying said first evaluation condition means that, when a presently detected border data is less than a preset value, and a previous border data is greater than said preset value, then set parking space detection to be in a first detecting parking space then obstacle state, said step B includes following step:
   b1. from said presently detected border data, store a plurality of new border data for said vehicle moving in a forward direction, each said border data containing said moved distance of vehicle, and said distance between vehicle and obstacle for reverse transmission of ultrasonic waves; and
   b2. determine if said border data satisfy said first evaluation condition, in case answer is negative, return to step b1, otherwise perform step D.

5. The parking space detection method as claimed in claim 4, wherein said first evaluation condition means that, said moved distance of vehicle is greater than 250 cm, number of said border data is greater than 30, or said distance for reverse transmission of said ultrasonic waves is greater than 200 cm.

6. The parking space detection method as claimed in claim 1, wherein in said step C, satisfying said second evaluation condition means that, when said presently detected border data is greater than said preset value, then set parking space detection to be in a first detecting obstacle then parking space state, said step C includes following step:
   c1: from said presently detected border data, search backward said previously stored border data, each of said border data containing said moved distance of vehicle, and said distance between vehicle and obstacle for reverse transmission of ultrasonic waves;
   c2: determine if one of said previously stored border data is less than said preset value, in case answer is negative, return to step c1, otherwise perform next step c3; and
   c3: determine if said plurality of border data satisfy a second evaluation condition, and in case answer is negative, return to said step c1, otherwise, perform said step D.

7. The parking space detection method as claimed in claim 6, wherein said second evaluation condition means that said moved distance of vehicle is greater than 250 cm, or number of said border data is greater than 30.

8. The parking space detection method as claimed in claim 1, wherein said data point is a border position, that is obtained through first finding out a first border data, having a first difference of difference between its border data and an average of said border data greater than said standard deviation.

* * * * *